United States Patent
Hoerentrup et al.

(10) Patent No.: US 9,286,663 B2
(45) Date of Patent: Mar. 15, 2016

(54) METHOD AND APPARATUS FOR FILTERING AN IMAGE USING A GUIDANCE IMAGE

(71) Applicant: THOMSON LICENSING, Issy de Moulineaux (FR)

(72) Inventors: Jobst Hoerentrup, Wennigsen (DE); Markus Schlosser, Hannover (DE)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/490,646

(22) Filed: Sep. 18, 2014

(65) Prior Publication Data

US 2015/0086128 A1 Mar. 26, 2015

(30) Foreign Application Priority Data

Sep. 20, 2013 (EP) ..................................... 13306287
Dec. 20, 2013 (EP) ..................................... 13306804

(51) Int. Cl.
*G06K 9/40* (2006.01)
*G06T 5/00* (2006.01)
*G06T 5/20* (2006.01)
*G06T 5/50* (2006.01)
*G06K 9/46* (2006.01)

(52) U.S. Cl.
CPC .............. *G06T 5/002* (2013.01); *G06K 9/4609* (2013.01); *G06T 5/20* (2013.01); *G06T 5/50* (2013.01); *G06T 2207/20028* (2013.01); *G06T 2207/20182* (2013.01)

(58) Field of Classification Search
None
See application file for complete search history.

(56) References Cited

U.S. PATENT DOCUMENTS

| 8,532,425 B2 | 9/2013 | Ali et al. |
| 2011/0188744 A1 | 8/2011 | Sun |
| 2015/0003725 A1* | 1/2015 | Wan ............................... 382/154 |

FOREIGN PATENT DOCUMENTS

WO  WO2013124312  8/2013

OTHER PUBLICATIONS

He, Kaiming, Jian Sun, and Xiaoou Tang. "Guided Image Filtering." Computer Vision—ECCV 2010 (2010): 1-14.*
Jachalsky, Jörn, Markus Schlosser, and Dirk Gandolph. "Confidence evaluation for robust, fast-converging disparity map refinement." Multimedia and Expo (ICME), 2010 IEEE International Conference on. IEEE, 2010.*
He, Kaiming, Jian Sun, and Xiaoou Tang. "Guided image filtering." Pattern Analysis and Machine Intelligence, IEEE Transactions on 35.6 (2013): 1397-1409 (published online Oct. 1, 2012).*
Paris et al: "A Fast Approximaton of the Bilateral FilterUsing a Signal Processing Approach", International Journal of Computer Vision, vol. 81, No. 1, Dec. 18, 2007, pp. 24-52.
Jachalsky et al: "Confidence evaluation for robust, fast-converging disparity map refinement", Multimedia and Expo, IEEE, Jul. 19, 2010, pp. 1399-1404.
He et al.: "Guided Image Filtering", Sep. 5, 2010, Computer Vision A ECCV 2010, pp. 1-14.

(Continued)

*Primary Examiner* — Andrew Moyer
(74) *Attorney, Agent, or Firm* — Tutunjian & Bitetto, P.C.

(57) ABSTRACT

A method and an apparatus for filtering an image using a guided image filter are described. A filter computes a filtering output using a guidance image. For calculating the filtering output confidence values associated to a filter input are taken into account. A confidence-weighted averaging is performed using the confidence values.

18 Claims, 1 Drawing Sheet

(56) References Cited

OTHER PUBLICATIONS

He et al.: A Global Sampling Method for Alpha Matting; CVPR '11 Proceedings of the 2011 IEEE Conference on Computer Vision and Pattern Recognition; pp. 2049-2056.

Tomasi et al.: "Bilateral Filtering for gray and color images"; Proceedings of the 1998 IEEE International Conference on Computer Vision, Bombay, India; pp. 839-846.
Search Report Dated Jun. 26, 2014.

* cited by examiner

METHOD AND APPARATUS FOR FILTERING AN IMAGE USING A GUIDANCE IMAGE

This application claims the benefit, under 35 U.S.C. §119 of European Patent Application No. 13306287.7, filed Sep. 20, 2013 and European Patent Application No. 13306804.9, filed Dec. 20, 2013.

FIELD OF THE INVENTION

The invention relates to a method and an apparatus for filtering an image, and more specifically to a method and an apparatus for filtering an image using a guided image filter.

BACKGROUND OF THE INVENTION

Recently a so-called Guided Image Filter has been developed as an edge-preserving smoothing filter. See He et al.: "*Guided Image Filtering*", Proceedings of the 11th European conference on Computer vision (ECCV '10) (2010), pp. 1-14. Besides the input for the data to be filtered, the Guided Image Filter provides another input for a guidance image that drives the filtering process. It has been proven to be efficient in a wide range of applications, including alpha matting (see He et al.: "*A Global Sampling Method for Alpha Matting*", Proceedings of the 2011 IEEE Conference on Computer Vision and Pattern Recognition (CVPR '11) (2011), pp. 2049-2056), and others. The Guided Image Filter has several key properties and advantages. A first advantage is the preservation of fine details in the filter input. A further advantage is that the filtered output has a higher quality than comparable filters. For example, it does not suffer from gradient reversal artifacts like the Bilateral Filter (see Tomasi et al.: "*Bilateral Filtering for gray and color images*", Proceedings of the 1998 IEEE International Conference on Computer Vision (ICCV) (1998), pp. 839-846). Finally, the Guide Image Filter supports an extremely efficient implementation. Its complexity is O(n), where n denotes the number of pixels in the image. Notably, this means that the computational complexity is independent of the chosen size of the filter kernel. No other edge-preserving smoothing filter has this property.

A confidence-aware Bilateral Filter is disclosed in Jachalsky et al.: "*Confidence evaluation for robust, fast-converging disparity map refinement*", 2010 IEEE International Conference on Multimedia and Expo (ICME) (2010), pp. 1399-1404. Besides potential gradient reversal artifacts, it suffers from computational complexity, especially for larger kernel sizes.

SUMMARY OF THE INVENTION

It is thus an object of the present invention to propose an improved solution for filtering an image using a guidance image.

According to the invention, this object is achieved by a method for filtering an image using a guided image filter, wherein a filtering output is computed using a guidance image. Confidence values associated to the filter input are taken into account for calculating the filtering output.

Accordingly, an apparatus configured to filter an image using a guided image filter comprises a filter configured to compute a filtering output using a guidance image, which is further configured to take confidence values associated to the filter input into account for calculating the filtering output.

Similarly, a computer readable storage medium has stored therein instructions enabling filtering of an image using a guided image filter, which when executed by a computer, cause the computer to compute a filtering output using a guidance image, wherein confidence values associated to the filter input are taken into account for calculating the filtering output.

In many applications, a confidence map accompanies the data to be filtered. A confidence value provides a measure of how reliable an element in the input data is deemed to be. The proposed solution extends the standard Guided Image Filter to take advantage of such confidence information. As a result the quality of output of the Guided Image Filter is improved by taking advantage of confidence data associated with the filter input. In particular, this is achieved without sacrificing the O(n) implementation complexity of the Guided Image Filter.

One element of the Guided Image Filter is a linear regression analysis. According to the invention, a weighted linear regression is employed where the confidence values serve as the weights, i.e. a confidence-aware Guided Image Filter is proposed.

As the Guided Image Filter is a smoothing filter that is able to preserve the fine details in the filter input, the Guided Image Filter is applicable in a broad range of applications. The confidence-aware Guided Image Filter is useful for any application where noisy data that is accompanied by confidence values is to be smoothed, e.g. alpha matting, disparity estimation, colorization, optical flow, and more. The proposed extended Guided Image Filter enables significant improvements in the quality of the final filter output with minimal computational overhead and while maintaining its O(n) complexity.

In case of alpha matting, for a training data set provided from www.alphamatting.com, the proposed confidence-aware Guided Image Filter can improve the quality (SAD) of the generated alpha mattes by about 28% on average when compared the standard version of the filter.

Compared to the confidence-aware Joint Bilateral Filter proposed by Jachalsky et al., the confidence-aware Guided Image Filter provides higher output quality.

Because of its low computational complexity and its low memory requirements, the confidence-aware Guided Image Filter is ideally suited for mobile devices.

For a better understanding, the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
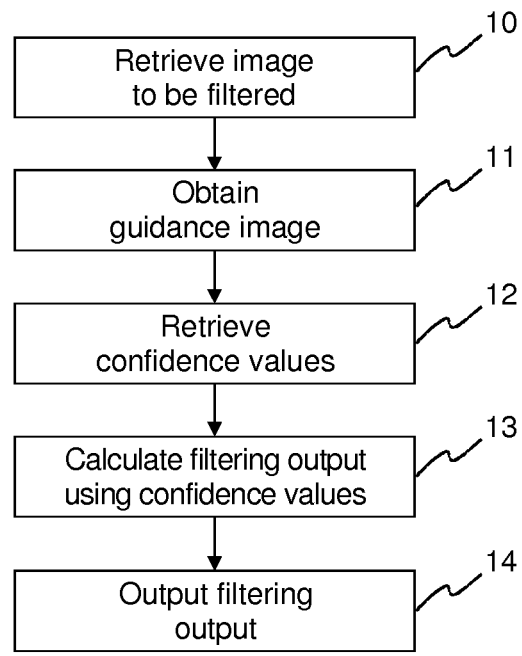
FIG. 1 schematically shows a method according to the invention for filtering an image using a guided image filter.

In the following two exemplary implementations of the Guided Image Filter shall be described. In one formulation of the Guided Image Filter (the classical filter formulation), the filter output q is formulated as a weighted average of its neighboring pixels:

$$q_i = \Sigma_j W_{ij}(I) p_j.$$

Here, $q_i$ is the filter output for pixel i, $p_j$ denotes the filter input at pixel j, and $W_{ij}(I)$ denotes the weight between pixels i and j, computed from the Guidance Image I. This formulates the output as a classical weighted average image filtering operation. Notably, the output of the Bilateral Filter of Tomasi et al. has the same formulation. Further, Jachalsky et al. disclosed a confidence aware extension of the Bilateral Filter, where the weights $W_{ij}$ are modulated by the confidence values. Therefore, it might seem straight forward to adopt the same approach for the Guided Image Filter as well. Unfortunately, this classical filter formulation of the Guided Image Filter has a super-linear complexity, making such an approach less interesting. Therefore, the present invention focuses on the primary formulation of the Guided Image Filter which provides O(n) computational complexity. It is a goal of the present invention to maintain this linear complexity.

The following provides a brief overview of the primary formulation of the Guided Image Filter that provides an implementation complexity of O(n). More details can be found in He et al.: "*Guided Image Filtering*", Proceedings of the 11th European conference on Computer vision (ECCV '10) (2010), pp. 1-14. Two cases are distinguished.

Case 1: The guidance image is a grey-scale image

The Guided Image Filter assumes that the filter output q is a linear transformation of the guidance image I in a window $\omega_k$ centered at pixel k:

$$q_i = a_k I_i + b_k, \; \forall i \in \omega_k,$$

where $I_i$ denotes the pixel i in the Guidance Image, and $a_k$ and $b_k$ are some coefficients assumed to be constant in $\omega_k$. To determine the coefficients, the Guided Image Filter seeks a solution that minimizes the difference between the filter input p and its output q. The specific cost function is:

$$E(a_k, b_k) = \sum_{i \in \omega_k} ((a_k I_i + b_k - p_i)^2 + \varepsilon a_k^2),$$

where $\varepsilon$ is a regularization parameter preventing the coefficient $a_k$ from becoming too large. The optimal coefficients can be computed via linear regression:

$$a_k = \frac{\overline{Ip}_k - \overline{I}_k \overline{p}_k}{\sigma_k^2 + \varepsilon}$$

$$b_k = \overline{p}_k - a_k \overline{I}_k.$$

Here, $$\overline{Ip}_k = \frac{1}{|\omega|} \sum_{i \in \omega_k} I_i p_i$$

denotes the mean product of $I_i$ and $p_i$ in $\omega_k$, $\overline{I}_k$ and $\sigma_k^2$ are the mean and variance of I in $\omega_k$, $|\omega|$ denotes the number of pixels in $\omega_k$, and $\overline{p}_k$ denotes the mean of p in $\omega_k$.

Since $q_i$ is contained in more than one window $\omega_k$, the Guided Image Filter expresses the final filter output as the average output over all windows:

$$q_i = \frac{1}{|\omega|} \sum_{k: i \in \omega_k} (a_k I_i + b_k) = \overline{a}_i I_i + \overline{b}_i, \; \text{where}$$

$$\overline{a}_i = \frac{1}{|\omega|} \sum_{k: i \in \omega_k} a_k$$

$$\overline{b}_i = \frac{1}{|\omega|} \sum_{k: i \in \omega_k} b_k.$$

Case 2: The guidance image is a 3-channel color image.

As for the grey-scale case, the Guided Image Filter assumes that the filter output q is a linear transformation of I in a window $\omega_k$ centered at pixel k:

$$q_i = a_k^T I_i + b_k, \; \forall i \in \omega_k,$$

where $I_i$ now is a 3×1 vector representing the color of pixel i in the Guidance Image, and $a_k$ is a 3×1 coefficient vector for $\omega_k$. Again, $a_k$ and $b_k$ are assumed to be constant in $\omega_k$ and are computed by linear regression as $$a_k = (\Sigma_k + \varepsilon U)^{-1} (\overline{Ip}_k - \overline{I}_k \overline{p}_k)$$

$$b_k = \overline{p}_k - a_k^T \overline{I}_k.$$

$\Sigma_k$ denotes the 3×3 covariance matrix of I in $\omega_k$. Its elements can be computed as $$\Sigma_k^{(m,n)} = \frac{1}{|\omega|} \sum_{i \in \omega_k} I_i^{(m)} \cdot I_i^{(n)} - \frac{1}{|\omega|} \left( \sum_{i \in \omega_k} I_i^{(m)} \right) \cdot \frac{1}{|\omega|} \left( \sum_{i \in \omega_k} I_i^{(n)} \right),$$

where $|\omega|$ denotes the number of pixels in $\omega_k$, and $I_i^{(x)}$ denotes the value of color channel x of I at pixel i.

As for the grey-scale case, since $q_i$ is contained in more than one window $\omega_k$, the Guided Image Filter expresses the final filter output as the averaged output over all windows that contain pixel i:

$$q_i = \frac{1}{|\omega|} \sum_{k: i \in \omega_k} (a_k^T I_i + b_k) = \overline{a}_i^T I_i + \overline{b}_i, \; \text{where}$$

$$\overline{a}_i = \frac{1}{|\omega|} \sum_{k: i \in \omega_k} a_k$$

$$\overline{b}_i = \frac{1}{|\omega|} \sum_{k: i \in \omega_k} b_k.$$

In the following a modified confidence-weighted linear regression will be described.

As can be seen above, the standard linear regressions in the Guided Image Filter do not take into account how reliable some input $p_i$ is deemed to be. The regression line is computed under the assumption that all $p_i$ are equally reliable. Any residuals are equally weighted. The proposed invention overcomes this restriction by computing a regression line that weights the residuals according to the confidence associated to $p_i$. For many applications, such confidence data is generated in a preceding processing stage together with the data to be filtered, and is thus readily available. In the case of a grey-scale image the coefficients are computed by minimizing the following energy:

$$E(a_k, b_k) = \sum_{i \in \omega_k} (c_i(a_k I_i + b_k - p_i)^2 + \varepsilon a_k^2),$$

where $c_i$ denotes the confidence associated to the filter input $p_i$. The computation of the weighted linear regression coefficients is known in the art. In general, any averaging operation is replaced by a weighted averaging operation. Since the present invention uses the confidence values as the weights, a weighted average value is computed as follows:

$$\tilde{X}_k = \frac{\Sigma_i X_i c_i}{\Sigma_i c_i},$$

where X refers to the quantity to be averaged.

The following describes the consequences for both the grey-scale case and the color case.

According to one aspect of the invention, the modified coefficients $\tilde{a}_k$ and $\tilde{b}_k$ for the grey-scale case are computed as $$\tilde{a} = \frac{\widetilde{Ip}_k - \tilde{I}_k \tilde{p}_k}{\tilde{\sigma}_k^2 + \varepsilon}$$

$$\tilde{b}_k = \tilde{p}_k - \tilde{a}_k \tilde{I}_k, \text{ with}$$

$$\widetilde{Ip}_k = \frac{\Sigma_i I_i p_i c_i}{\Sigma_i c_i}$$

$$\tilde{I}_k = \frac{\Sigma_i I_i c_i}{\Sigma_i c_i}$$

$$\tilde{p}_k = \frac{\Sigma_i p_i c_i}{\Sigma_i c_i}$$

$$\tilde{\sigma}_k^2 = \frac{\Sigma_i c_i (I_i - \tilde{I}_k)^2}{\Sigma_i c_i}.$$

Similarly, the modified coefficients $\tilde{a}_k$ and $\tilde{b}_k$ for the color case are computed as $$\tilde{a}_k = (\tilde{\Sigma}_k + \varepsilon U)^{-1} (\widetilde{Ip}_k - \tilde{I}_k \tilde{p}_k)$$

$$\tilde{b}_k = \tilde{p}_k - \tilde{a}_k^T \tilde{I}_k, \text{ with}$$

$$\widetilde{Ip}_k = \frac{\Sigma_i I_i p_i c_i}{\Sigma_i c_i}$$

$$\tilde{I}_k = \frac{\Sigma_i I_i c_i}{\Sigma_i c_i}$$

$$\tilde{p}_k = \frac{\Sigma_i p_i c_i}{\Sigma_i c_i}.$$

Here $\tilde{\Sigma}_k$ denotes the confidence-weighted covariance matrix of I in $\omega_k$. Its elements can be computed by $$\tilde{\Sigma}_k^{(m,n)} = \frac{\Sigma_i I_i^{(m)} \cdot I_i^{(n)} c_i}{\Sigma_i c_i} - \frac{\Sigma_i I_i^{(m)} c_i}{\Sigma_i c_i} \cdot \frac{\Sigma_i I_i^{(n)} c_i}{\Sigma_i c_i}.$$

Since the pixel $q_i$ is contained in more than one window $\omega_k$, according to the standard Guided Image Filter, the coefficients of the individual windows are averaged to compute the final output $q_i$. According to another aspect of the invention, the output $q_i$ is computed by confidence-weighted averaging.

In one embodiment of the invention, the contribution of a window is weighted according to its window confidence, e.g. the sum (or equivalently the average) of the confidence values within the window. In this case, the coefficients are computed by $$\bar{\tilde{a}}_i = \frac{\sum_{k:i \in \omega_k} \tilde{a}_k c_k}{\sum_{k:i \in \omega_k} c_k}$$

$$\bar{\tilde{b}}_i = \frac{\sum_{k:i \in \omega_k} \tilde{b}_k c_k}{\sum_{k:i \in \omega_k} c_k}, \text{ with}$$

$$c_k = \sum_{i \in \omega_k} c_i.$$

In another embodiment of the invention, the contribution of a window is weighted according to the confidence of its center pixel. In this case, the coefficients are computed by $$\bar{\tilde{a}}_i = \frac{\sum_{k:i \in \omega_k} \tilde{a}_k c_k}{\sum_{k:i \in \omega_k} c_k}$$

$$\bar{\tilde{b}}_i = \frac{\sum_{k:i \in \omega_k} \tilde{b}_k c_k}{\sum_{k:i \in \omega_k} c_k}.$$

Here, $c_k$ denotes the confidence value associated to the center pixel in the window $\omega_i$.

The last five equations above hold for the grey-scale case and the color case. In the grey-scale case, $a_k$, $b_k$, $\bar{\tilde{a}}_i$ and $\bar{\tilde{b}}_i$ are scalar values, whereas for the color case, they are 3×1 vectors.

For the grey-scale case, the final filter output is computed as $$q_i = \bar{\tilde{a}}_i I_i + \bar{\tilde{b}}_i.$$

whereas for the color case, the final filter output is computed as $$q_i = \bar{\tilde{a}}_i^T I_i + \bar{\tilde{b}}_i.$$

A method according to one embodiment of the invention for filtering an image using a guided image filter is schematically shown in FIG. 1. In a first step the image to be filtered is retrieved 10. Then a guidance image is obtained 11, which may be the image to be filtered or a different image. Then confidence values associated to the filter input are retrieved 12. The confidence values are taken into account for calculating 13 the filtering output. Finally, the calculated filtering output is made available 14.

Figure 2:
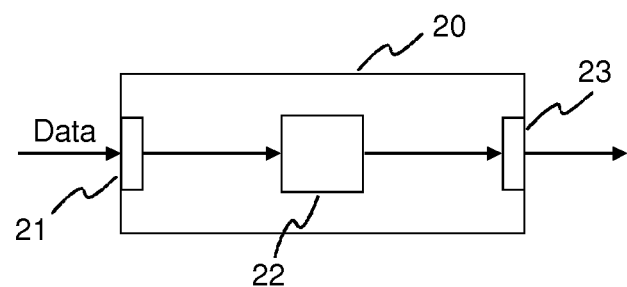
FIG. 2 illustrates an apparatus adapted to implement a solution according to the invention for filtering an image using a guided image filter.

FIG. 2 schematically illustrates one embodiment of an apparatus 20 adapted to implement a solution according to the invention for filtering an image using a guided image filter. The apparatus has an input 21 with one or more input units for retrieving 10 the image to be filtered, obtaining 11 a guidance image, and retrieving 12 confidence values associated to the filter input, e.g. from an attached storage or from a network. It is likewise possible that the confidence values are calculated by the apparatus based on other input data, or that more than one input is used for retrieving the various input data. Also, the data may be obtained from an internal storage of the apparatus 20. A filter 22 calculates 13 the filtering output, taking into account the confidence values. The resulting filtering output is made available 14 at an output 23. The filter 22 may likewise be implemented as software running on a processor. Also, the input 21 and the output 23 may be combined into a single bidirectional interface.

The invention claimed is:

1. A method for filtering an image using a guided image filter, comprising:
   retrieving the image to be filtered, a guidance image, and confidence values associated with the image to be filtered;
   computing a filtering output from filter input values derived from the image to be filtered and confidence values associated with the filter input values using a linear transformation of the guidance image in a window, wherein coefficients for the linear transformation are computed from confidence-weighted average values obtained for the window; and
   outputting the computed filtering output.

2. The method according to claim 1, wherein computing the filtering output comprises computing a regression line that weights residuals according to the confidence values associated with the filter input values.

3. The method according to claim 1, wherein the filtering output is calculated using a confidence-weighted averaging of coefficients of individual windows.

4. The method according to claim 1, wherein a contribution of a window is weighted according to its window confidence.

5. The method according to claim 4, wherein the window confidence is the sum or the mean value of the confidence values within the window.

6. The method according to claim 1, wherein a contribution of a window is weighted according to a confidence of the center pixel of the window.

7. An apparatus configured to filter an image using a guided image filter, the apparatus comprising;
   an input configured to retrieve the image to be filtered, a guidance image, and confidence values associated with the image to be filtered;
   a filter configured to compute a filtering output from filter input values derived from the image to be filtered and confidence values associated with the filter input values using a linear transformation of the guidance image in a window, wherein coefficients for the linear transformation are computed from confidence-weighted average values obtained for the window; and
   an output for the computed filtering output.

8. The apparatus according to claim 7, wherein the filter is configured to compute the filtering output by computing a regression line that weights residuals according to the confidence values associated with the filter input values.

9. The apparatus according to claim 7, wherein the filter is configured to compute the filtering output using a confidence-weighted averaging of coefficients of individual windows.

10. The apparatus according to claim 7, wherein the filter is configured to weight a contribution of a window according to its window confidence.

11. The apparatus according to claim 10, wherein the window confidence is the sum or the mean value of the confidence values within the window.

12. The apparatus according to claim 7, wherein the filter is configured to weight a contribution of a window according to a confidence of a center pixel of the window.

13. A non-transitory computer readable storage medium having stored therein instructions enabling filtering of an image using a guided image filter which, when executed by a computer, cause the computer to;
   retrieve the image to be filtered, a guidance image, and confidence values associated with the image to be filtered;
   compute a filtering output from filter input values derived from the image to be filtered and confidence values associated with the filter input values using a linear transformation of the guidance image in a window, wherein coefficients for the linear transformation are computed from confidence weighted average values obtained for the window; and
   output the computed filtering output.

14. The non-transitory computer readable storage medium according to claim 13, wherein the instructions cause the computer to compute the filtering output by computing a regression line that weights residuals according to the confidence values associated with the filter input values.

15. The non-transitory computer readable storage medium according to claim 13, wherein the instructions cause the computer to compute the filtering output using a confidence-weighted averaging of coefficients of individual windows.

16. The non-transitory computer readable storage medium according to claim 13, wherein the instructions cause the computer to weight a contribution of a window according to its window confidence.

17. The non-transitory computer readable storage medium according to claim 16, wherein the window confidence is the sum or the mean value of the confidence values within the window.

18. The non-transitory computer readable storage medium according to claim 13, wherein the instructions cause the computer to weight a contribution of a window according to a confidence of a center pixel of the window.

* * * * *